(12) United States Patent
Hechtfischer et al.

(10) Patent No.: US 11,208,030 B2
(45) Date of Patent: Dec. 28, 2021

(54) ADAPTIVE ILLUMINATION METHOD FOR VEHICLE HEADLIGHT

(71) Applicant: Lumileds LLC, San Jose, CA (US)

(72) Inventors: Ulrich Hechtfischer, Aachen (DE); Steffen Zozgornik, Leverkusen (DE)

(73) Assignee: Lumileds LLC, San Jose, CA (US)

( * ) Notice: Subject to any disclaimer, the term of this patent is extended or adjusted under 35 U.S.C. 154(b) by 412 days.

(21) Appl. No.: 16/318,657

(22) PCT Filed: Jul. 12, 2017

(86) PCT No.: PCT/EP2017/067574
§ 371 (c)(1),
(2) Date: Jan. 17, 2019

(87) PCT Pub. No.: WO2018/015248
PCT Pub. Date: Jan. 25, 2018

(65) Prior Publication Data
US 2019/0283661 A1 Sep. 19, 2019

(30) Foreign Application Priority Data
Jul. 20, 2016 (EP) .................................. 16180400

(51) Int. Cl.
*B60Q 1/00* (2006.01)
*B60Q 1/08* (2006.01)
(Continued)

(52) U.S. Cl.
CPC .............. *B60Q 1/085* (2013.01); *F21S 41/14* (2018.01); *F21S 41/147* (2018.01); *F21S 41/16* (2018.01);
(Continued)

(58) Field of Classification Search
CPC ...... B60Q 1/085; F21S 41/663; F21S 41/147; F21S 41/16
See application file for complete search history.

(56) References Cited

U.S. PATENT DOCUMENTS 9,162,610 B2   10/2015   Funk et al.
9,517,717 B2   12/2016   Komatsu et al.
(Continued)

FOREIGN PATENT DOCUMENTS

DE   102010028949 A1   11/2011
EP       25678866 A2    3/2013
(Continued)

OTHER PUBLICATIONS

EPO as ISA, "International Search Report and Written Opinion" dated Sep. 29, 2017 from International Application No. PCT/EP2017/067574, filed Jul. 12, 2017, 14 pages.
(Continued)

*Primary Examiner* — Gerald J Sufleta, II

(57) ABSTRACT

The invention describes a method of providing an illumination pattern for vehicle lighting, the method comprising the steps of:
  providing a light pattern comprising a multitude of scanlines of white light by illuminating a light converter by means of a scanning laser arrangement for illuminating an area, wherein the scanlines are characterized by a defined scanline width;
  adapting a cut-off of the light pattern by changing a position of at least one scanline with respect to a reference illumination pattern or by dimming at least a limited portion of at least one scanline.

The invention further describes a vehicle headlight system and a computer program product.

20 Claims, 7 Drawing Sheets

(51) Int. Cl.
*F21S 41/663* (2018.01)
*F21S 41/147* (2018.01)
*F21S 41/16* (2018.01)
*F21S 41/14* (2018.01)

(52) U.S. Cl.
CPC ...... *F21S 41/663* (2018.01); *B60Q 2300/054* (2013.01); *B60Q 2300/056* (2013.01)

(56) References Cited

U.S. PATENT DOCUMENTS

| | | | |
|---|---|---|---|
| 9,702,519 B2 | 7/2017 | Reiners | |
| 9,964,842 B2 | 5/2018 | Hashizume | |
| 10,323,812 B2 * | 6/2019 | Yang | F21S 41/365 |
| 10,323,814 B2 * | 6/2019 | Yagi | F21S 41/365 |
| 10,576,874 B2 * | 3/2020 | Kurashige | F21S 41/645 |
| 2008/0043481 A1 * | 2/2008 | Yokoyama | G02B 26/085 362/465 |
| 2008/0158892 A1 * | 7/2008 | Davis | G02B 5/003 362/362 |
| 2009/0046474 A1 | 2/2009 | Sato et al. | |
| 2010/0194276 A1 * | 8/2010 | Okubo | F21S 41/155 315/82 |
| 2011/0249460 A1 * | 10/2011 | Kushimoto | F21V 9/30 362/510 |
| 2012/0327678 A1 | 12/2012 | Koike et al. | |
| 2013/0027951 A1 * | 1/2013 | Takahashi | F21S 41/675 362/465 |
| 2013/0057149 A1 | 3/2013 | Funk et al. | |
| 2013/0258689 A1 * | 10/2013 | Takahira | F21S 41/176 362/465 |
| 2014/0029282 A1 * | 1/2014 | Ravier | F21S 41/173 362/510 |
| 2015/0137680 A1 | 5/2015 | Komatsu | |
| 2015/0175053 A1 | 6/2015 | Schwaiger et al. | |
| 2015/0369437 A1 | 12/2015 | Reinprecht et al. | |
| 2016/0073000 A1 | 3/2016 | Abele et al. | |
| 2016/0347237 A1 * | 12/2016 | Bhakta | F21S 41/675 |
| 2017/0016588 A1 * | 1/2017 | Saito | F21S 41/285 |
| 2018/0147978 A1 * | 5/2018 | Reisinger | B60Q 1/085 |

FOREIGN PATENT DOCUMENTS

| | | |
|---|---|---|
| EP | 25678866 A3 | 12/2014 |
| EP | 2918446 A1 | 9/2015 |
| EP | 3018004 A1 | 5/2016 |
| JP | 2013008480 A | 1/2013 |
| JP | 2013154746 A | 8/2013 |
| JP | 2016038966 A | 3/2016 |
| JP | 2016507136 A | 3/2016 |
| JP | 2016071128 A | 5/2016 |
| WO | 2014024385 A1 | 2/2014 |
| WO | 2014121314 A1 | 8/2014 |
| WO | 2014121315 A1 | 8/2014 |
| WO | 2016021154 A1 | 2/2016 |
| WO | 2016087025 A1 | 6/2016 |

OTHER PUBLICATIONS

Extended European Search Report dated Jan. 4, 2017 from European Patent Application No. 16180400.0 filed Jul. 20, 2016, 7 pages.

* cited by examiner

ADAPTIVE ILLUMINATION METHOD FOR VEHICLE HEADLIGHT

CROSS-REFERENCE TO RELATED APPLICATION

The present application is a § 371 application of International Application No. PCT/EP2017/067574 filed Jul. 12, 2017 and titled "ADAPTIVE ILLUMINATION METHOD FOR VEHICLE HEADLIGHT," which claims the benefit of European Patent Application No. 16180400.0 filed Jul. 20, 2016. International Application No. PCT/EP2017/067574 and European Patent Application No. 16180400.0 are incorporated herein.

FIELD OF THE INVENTION

The invention relates to a laser scanning method of providing an adaptive illumination pattern for vehicle lighting. The invention further relates to a vehicle headlight system comprising a laser scanner being arranged to perform the method. The invention finally relates to a corresponding computer program product.

BACKGROUND OF THE INVENTION

In modern automotive headlighting, a strong trend goes to adaptive systems where the light distribution can be changed dynamically. For example one would like to have a high-beam bundle, but with a well-defined and moving dark section to spare out an oncoming car, to avoid glare. Or one would like to illuminate a given road sign, or an obstacle that the car's camera could have detected.

Technically, such systems can be realized with different approaches, with increasing performance, but also complexity: switchable mechanical apertures, LED matrix lights, micro-displays (as in beamers), or laser scanners.

As an example, DE102010028949A1 discloses a laser based headlight scanning a laser beam in a fixed pattern over a luminescent material which is then mapped by a secondary optics onto the road. DE102010028949A1 stresses that, principally, such arrangement can obtain a very high resolution of up to 1000×1000 pixels. In particular, such high resolution allows adjusting the position of the bright/dark cut-off line of a low beam to an accuracy of up to 0.1° just by appropriately setting the row signal for the laser scanner.

SUMMARY OF THE INVENTION

It is an object of the present invention to provide a laser scanning method of providing an adaptive illumination pattern for vehicle lighting. The method may beneficially be used in a vehicle headlight as, for example, an automotive headlight or a headlight of a motorbike.

According to a first aspect, the invention comprises a method of providing an illumination pattern for vehicle lighting. The method comprises the steps of:
  providing a light pattern comprising a multitude of scanlines of white light by illuminating a light converter by means of a scanning laser arrangement for illuminating an area, wherein the scanlines are characterized by a defined scanline width;
  adapting a cut-off of the light pattern by changing a position of at least one scanline with respect to a reference illumination pattern or by dimming at least a limited portion of at least one scanline.

The scanning laser arrangement may comprise, for example, a blue laser. The blue laser is adapted to emit a blue laser beam, which can be electronically switched and direction-controlled by a small mirror, typically a MEMS (micro electromechanical system). In this way, the laser beam is quickly steered in scanlines over a surface of a light converter. The scanlines are lines of the spot of the laser beam on the surface of the light converter. The scanlines may be continuous or non-continuous scanlines. The scanlines may be straight, curved or may even comprise a buckling or corner. The scanlines are usually arranged such that two adjacent scanlines overlap to a defined extent on the surface of the light converter. The overlap may be half of a scanline width, wherein the scanline width is given by a spot size of the laser beam. The overlap may alternatively be ⅓, ¼, ⅔ or the like of the scanline width.

The surface of the converter device may comprise a phosphor surface partially converting the blue laser light to yellow light, which adds up with the remaining blue light to form white light. If the movement of the white-light spot on the phosphor surface is fast enough, it is perceived as a steady white-light distribution or image. This image is then projected onto, for example, a road through a lens, as in standard projection headlamps. By a control of the mirror movement, synchronized with suitable switching of the laser beam (on and off, different intensities), a large variety of images on the phosphor, and thus light distributions on the road, can be created.

It is important to note two special features of such scanning laser arrangements. These two special features are due to the high power, and thus non-negligible beam diameter of such systems. First, the spot size will not be negligible; it will probably not shrink below e.g. 200-300 µm. This is only about a factor of 10 smaller than the smallest dimension of the phosphor target of the light converter of e.g. 3 mm. Second, the beam-steering mirror will have a limited scan speed because of its finite size (of e.g. 2 mm as partly caused by the high laser power). Also, as it has to be controllable in a flexible manner (changing line patterns), it cannot be very fast either, due to mechanical constraints. Since the frame repetition rate must be high (e.g. 100 Hz) to avoid flicker, the time per frame is limited to e.g. 10 ms. Given the slow scan speed of flexible mirrors, the number of lines in such systems will be small, e.g. 11, 14 or 20 lines. This matches the fact that the beam diameter has to be large as the complete height of the phosphor target needs to be covered with, for example, only 20 lines. In such a setup, dark zones in the illumination pattern can be easily created by switching off the laser at the right moments.

The problem, however, is the low resolution that the system will achieve in the vertical direction essentially perpendicular to the main direction of movement of the laser spot on the surface of the converter device. Eleven or fourteen segments might appear still good enough for automotive headlighting, but moving horizontal edges which define a cut-off of the light pattern can only be moved in steps, by switching off portions of one line after the other. These steps may make the image appear very unsteady and disturbing for the traffic participants. Therefore, it is desirable to be able to move horizontal edges smoother, without revealing the poor native vertical resolution of the system. It is therefore proposed to change a position of at least one scanline with respect to a reference illumination pattern or to dim at least a limited portion of at least one scanline.

The reference illumination pattern comprises all scanlines in which, for example, no adaption to a time varying situation such as an approaching vehicle of approaching traffic has been performed. The reference pattern may depend on an illumination mode (e.g. low beam or high beam).

The illumination pattern is adapted such that in case of a necessary adaption (e.g. approaching traffic, traffic sign) a cut-off which is part of an area which is not illuminated by the light pattern is changed in a smoother way. A cut-off may be adapted by simultaneously changing the position of all scanlines in comparison to the reference illumination pattern. The whole illumination pattern may in this case be adapted by elevating or lowering the cut-off.

The step of adapting the cut-off of the light pattern by changing the position of at least one scanline comprises the step of:

switching off at least a part of a scanline to provide a non-continuous scanline.

It may be necessary in some situations to adapt the light pattern provided by means of the laser light or laser beam and the light converter by providing or adapting a window or more generally a dark zone in the light pattern in order to avoid, for example, glare of, for example, other traffic participants. Parts of one, two, three or more scanlines may therefore be switched off. Several scanlines may, for example, be subsequently switched off.

The method further comprises the additional step of:

illuminating an area previously illuminated by the non-continuous scanline (before switching off at least a part of the scanline) by changing a position of a continuous scanline adjacent to the non-continuous scanline.

Changing the position of at least one continuous scanline with respect to the reference illumination pattern enables a shift of the cut-off such that the shift is smaller in comparison to the case that only at least a part of the scanline in the reference illumination pattern is switched off. The continuous scanline adjacent to the non-continuous scanline is shifted such that a part of an area previously illuminated by the switched-off part of the non-continuous scanline is now illuminated by the adjacent continuous scanline. The position of the continuous scanline adjacent to the non-continuous scanline is essentially shifted perpendicular to the scanning direction of the laser spot.

The position of the scanline adjacent to the non-continuous scanline may be changed or shifted by expanding a distance between at least two continuous scanlines, wherein one of the at least two continuous scanlines is the continuous scanline adjacent to the non-continuous scanline.

The distance between adjacent scanlines in the reference illumination pattern may be the same or may be different across the reference illumination pattern. An area previously illuminated by means of the scanline which is switched off is illuminated by means of at least one continuous scanline, the continuous scanline being adjacent to the non-continuous scanline. The distance between two, three, four or more neighboring or adjacent continuous scanlines below or above the cut-off is increased in comparison to the distance between those scanlines in the reference pattern. The distance between the continuous scanlines below or above the cut-off may be decreased in a subsequent step in order to shift the cut-off.

The method may comprise the additional step of:

stepwise decreasing the distance between the at least two scanlines in a subsequent step after expanding the distance.

The distance between the two, three, four or more continuous scanlines below or above the cut-off may be decreased step-by-step such that the original distance (as in the reference illumination pattern) is reached after two, three, four or more steps in order to shift the cut-off smoothly. The edge of the cut-off is shifted to many intermediate positions in between the positions which are given by the reference illumination pattern. The change of the distance between continuous scanlines may not be the same for all continuous scanlines. The change of the distance may, for example, be bigger between the adjacent continuous scanline (first continuous scanline) and the continuous scanline directly above or below the adjacent continuous scanline (second continuous scanline) than the change of the distance between the second continuous scanline and a further continuous scanline above or below the second continuous scanline (third continuous scanline). The different distance adaptions may help to avoid or at least limit visible intensity variations in the illumination pattern. This also comprises the case that there may be an adaptable upper cut-off (in the upper part of the illumination pattern) and an adaptable lower cut-off (in the lower part of the illumination pattern). Such an illumination pattern may, for example, comprise the case that only the fourth, fifth, sixth, seventh and eighth scanline of 20 scanlines are non-continuous scanlines. The positions of the non-continuous scanlines in between the upper cut-off and the lower cut-off may, for example, be changed such that a position of a non-continuous scanline in the middle, e.g. sixth scanline in the example, between the upper cut-off and the lower cut-off is nearly unchanged but the distance between the fourth and the fifth scanline is essentially the same as the distance between the seventh and eighth but the distance between the fifth and sixth scanline and the sixth and seventh is smaller.

The method as described above may comprise the additional steps of:

providing at least two adjacent non-continuous scanlines; and decreasing a distance between the at least two adjacent non-continuous scanlines.

Increasing the distance between the continuous scanlines may have the effect that there may be a bright line in the illumination pattern at the overlap of the continuous scanline adjacent to the window or more general the dark zone of the illumination pattern and the neighboring non-continuous scanline. The distance between the non-continuous scanline next to the cut-off and at least an adjacent non-continuous scanline may therefore be decreased such that an overlap between the non-continuous scanline next to the cut-off and the continuous scanline defining the cut-off is reduced. The distance between two, three, four or more non-continuous scanlines may be decreased in order to smoothen an intensity distribution of the illumination pattern. The distance between the two, three, four or more non-continuous scanlines may be changed depending on the distance of the respective non-continuous scanline to the cutoff. The change of the distance may, for example, be smaller between the non-continuous scanline at the cut-off (first non-continuous scanline) and the non-continuous scanline directly above or below the first non-continuous scanline (second non-continuous scanline) than the change of the distance between the second non-continuous scanline and a further non-continuous scanline (third non-continuous scanline) above or below the second non-continuous scanline. The different distance adaptions may help to avoid or at least limit visible intensity variations in the illumination pattern.

The method may further comprise the additional step of:

adapting an intensity of at least one scanline such that an integral intensity of at least two adjacent scanlines is adapted to the change of the distance between the two adjacent scanlines.

The expansion or compression of the scanline pattern on a region of the light converter will change the "density" of the scanlines as described above. Therefore the apparent brightness may change in a visible way. (Note that the boundaries between the lines are normally not visible in practice, due to the generous overlap of adjacent beams). The changes in brightness due to the deliberate "breathing", i.e. the compression and expansion of the scanline pattern, will be small but also periodic, so that they could be perceived as flicker, which may be equally disturbing as a "jumping" horizontal edge or cut-off. To compensate for this, the laser intensity may be slightly increased where the line pattern is expanded, and decreased where it is compressed. The intensity of each scanline may be adapted individually. The variation of the intensity may be determined by means of a change of the overlap between adjacent scanlines and/or intensity variations of adjacent scanlines (either continuous or non-continuous scanlines).

The step of switching off at least a part of a scanline may alternatively or in addition comprise the step of:
  providing a gap in the at least one scanline; and
  increasing the gap along a longitudinal extension of the at least one scanline.

A small gap may be provided in a continuous scanline in a first run by shortly switching off the laser. The gap is increased step-by-step in the scanning direction or along the scanline in a second, third, fourth or a further run. The dark area or zone within the illumination pattern increases like an opening curtain.

The step of adapting the cut-off of the light pattern by dimming at least the limited portion of the at least one scanline comprises the step of:
  changing an intensity of the white light within the limited portion of the at least one scanline.

The intensity of the white light may be exponentially changed within a first time period of the dimming. Exponentially decreasing or increasing the intensity in a first time period of the dimming may provide a smoother impression of shift of the cut-off. The first time period may, for example, comprise the complete time span until switching off or only a part thereof.

According to a further aspect a vehicle headlight system is provided. The vehicle headlight system comprises at least one laser. The at least one laser is adapted to emit laser light with a laser peak emission wavelength. The vehicle headlight system further comprises a light converter. The light converter is adapted to convert the laser light to converted light, wherein a peak emission wavelength of the converted light is in a longer wavelength range than the laser peak emission wavelength. The vehicle headlight system further comprises a scanner. The scanner is adapted to provide a light pattern comprising a multitude of scanlines on the light converter. The vehicle headlight system further comprises a controller, wherein the controller is adapted to control a cut-off of the light pattern by changing a position of at least one scanline with respect to a reference illumination pattern or by dimming at least a limited portion of at least one scanline.

The vehicle headlight system may comprise two, three, four or more lasers. The scanner may comprise a dynamic mirror as, for example, a MEMS mirror in order to provide or project the scanlines on the light converter. The light converter may comprise a conversion element comprising a phosphor for converting, for example, at least a part of the blue laser light to yellow light. The phosphor may, for example, be a ceramic block of Cerium doped Yttrium-Aluminum-Garnet (YAG). The controller may be adapted to control the scanner and/or the laser in order to change or shift the position of the scanlines or to dim the at least one laser as described above. The controller may be an integrated part of a vehicle headlight or an external control device connected to the vehicle headlight. The controller may comprise an interface to connect the vehicle headlight system to a vehicle control system.

According to a further aspect is a computer program product provided. The computer program product comprises code means which can be saved on at least one memory device comprised by the inventive vehicle headlight system or on at least one memory device of a control device coupled with the vehicle headlight system, wherein the code means being arranged such that the inventive method can be executed by means of at least one processing device comprised by the vehicle headlight system or by means of at least one processing device of the control device coupled with the vehicle headlight system.

The at least one memory device may comprise one or more memory modules as, for example, memory chips. The at least one processing device may comprise one or more processors or microprocessors. The at least one memory device and/or the at least one processing device may be comprised by the controller.

It shall be understood that the inventive methods and the inventive vehicle headlight system have similar and/or identical embodiments, in particular, as defined in the claims.

It shall be understood that a preferred embodiment of the invention can also be any combination of the claims.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

DETAILED DESCRIPTION OF EMBODIMENTS

Figure 1:
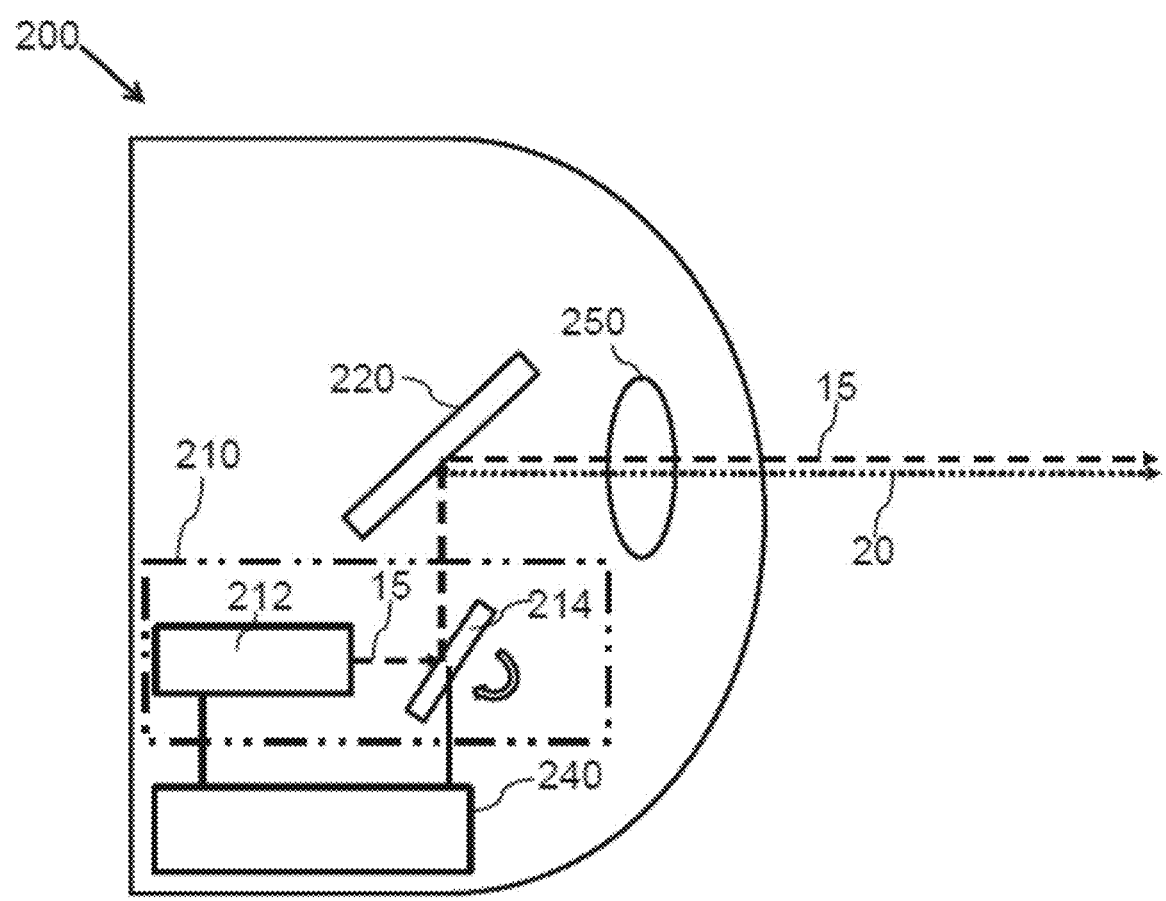
FIG. 1 shows a principal sketch of a vehicle headlight system

FIG. 1 shows a principal sketch of a vehicle headlight system 200. The vehicle headlight system 200 comprises at least one laser 212. The at least one laser 212 is adapted to emit laser light 15 with a laser peak emission wavelength. The peak emission wavelength is preferably in the blue wavelength range. The vehicle headlight system 200 further comprises a light converter 220. The light converter 220 is adapted to convert the laser light 15 to converted light 20, wherein a peak emission wavelength of the converted light 20 is in a longer wavelength range than the laser peak emission wavelength. The peak emission wavelength of the converted light 20 is preferably in the yellow wavelength range. The vehicle headlight system 200 further comprises a scanner 214. The scanner 214 is adapted to provide a light pattern comprising a multitude of scanlines on the light converter 220. The at least one laser 212 and the scanner 214 are arranged in a scanning laser arrangement 210 which is coupled to a controller 240 which is in this case an integrated part of the vehicle headlight system 200. The vehicle headlight system 200 may be part of a vehicle headlight. The scanner is in this case a MEMS micro mirror. The controller 240 is adapted to control a cut-off of the light pattern by changing a position of at least one scanline with respect to a reference illumination pattern or by dimming at least a limited portion of at least one scanline. The controller 240 is arranged to control the micro mirror such that a position of the scanline on the light converter 220 is shifted. Hence, an illumination pattern comprising a mixture of laser light 15 and converted light 20 which is projected by means of an optical arrangement 250 can be changed. The optical arrangement 250 may comprise one, two, three or more optical elements like lenses, mirrors, apertures and the like. The controller 240 is further arranged to dim the laser light 15 or to adapt the intensity of the laser light 15 in order to provide a smooth illumination pattern.

Figure 2:
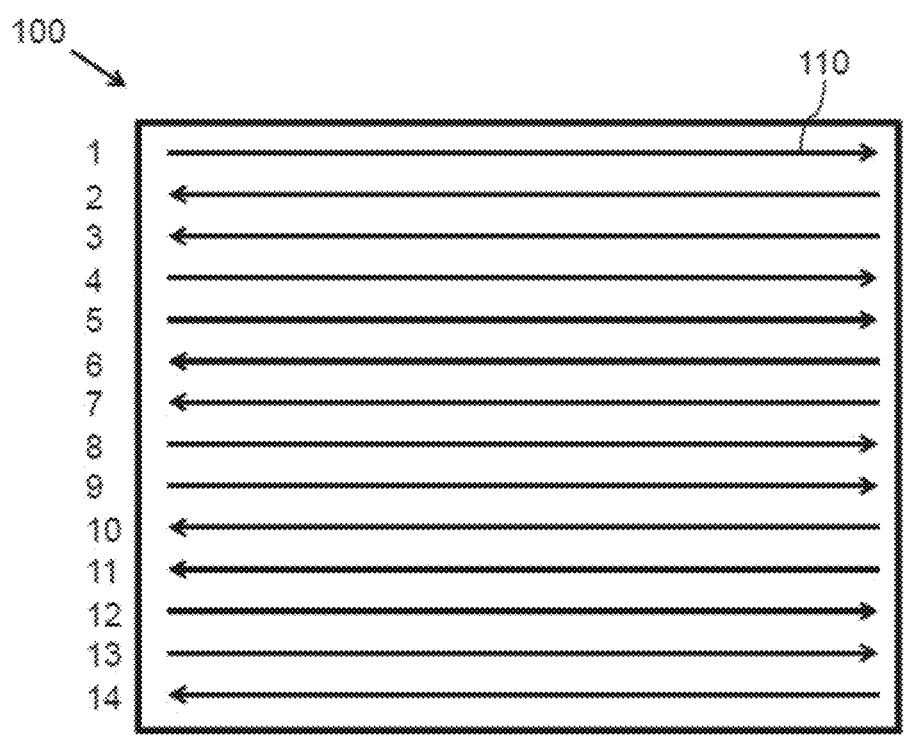
FIG. 2 shows a principal sketch of a first illumination pattern

FIG. 2 shows a principal sketch of a first illumination pattern 100. The normal approach to create the image on the phosphor is by line scanning FIG. 2 shows a straightforward line-scanning pattern. There are 14 scanlines, and the laser jumps downward from line 1 to line 3, from 3 to 5, etc., leaving gaps which are filled on the way back upwards (well-known "interleaving"). The scanlines 110 have a defined scanline width which is essentially defined by a diameter of the laser spot on the light converter essentially perpendicular to a scanning direction indicated by the arrows. The first illumination pattern 100 shows a reference illumination pattern in which no adaption of the scanlines 110 has been performed in order to adapt the illumination pattern to an object which may appear in an area illuminated by the illumination pattern 100.

Figure 3:
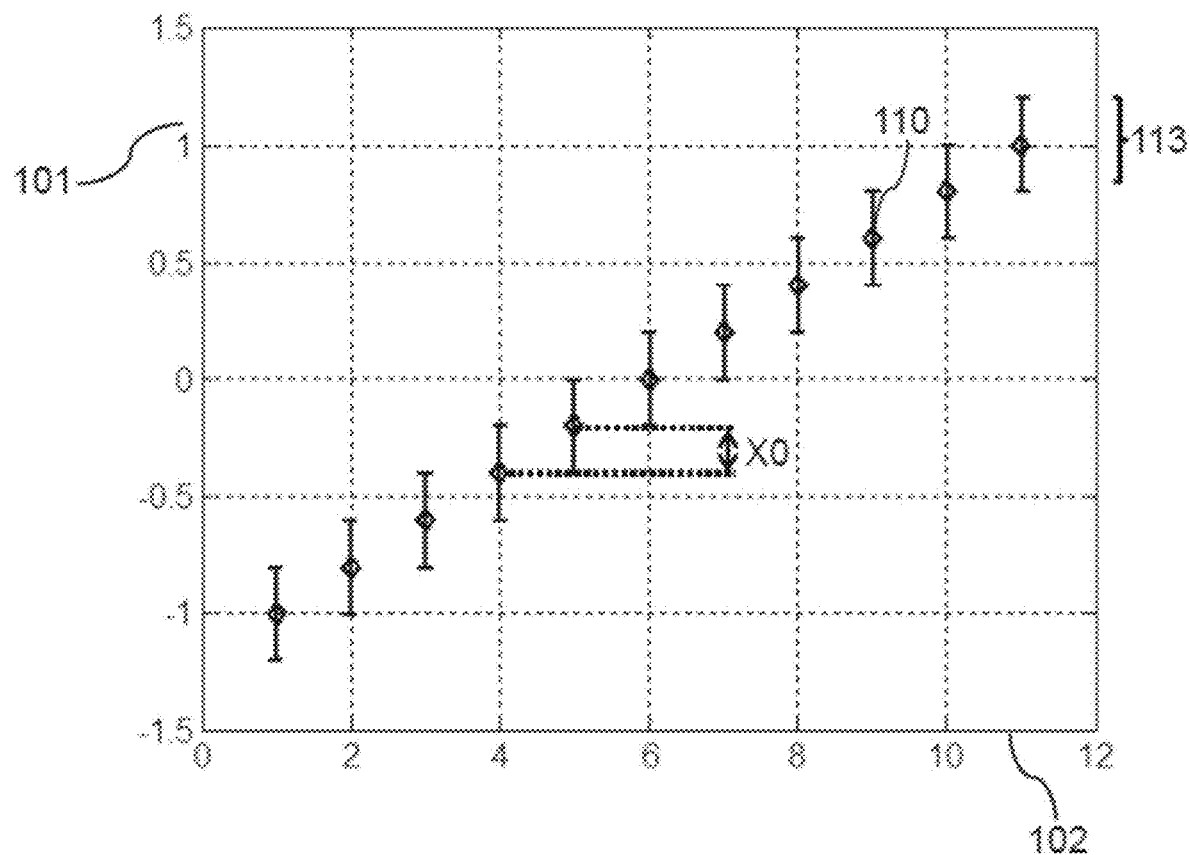
FIG. 3 shows a principal sketch of a second illumination pattern

FIG. 3 shows a principal sketch of a second illumination pattern 100. The second illumination pattern 100 is again a reference illumination pattern with 11 scanlines 110. The abscissa 102 denotes the number of the scanline 110. The ordinate 101 shows the relative position of the respective scanline 110 on the light converter. The scanlines 110 have a scanline width 113 as described above and a distance between two scanlines 110 is given by X0 which is in this case the same for all scanlines 110. The scanlines 110 overlap such that the light converter is illuminated by means of laser light of two scanlines 110 up to the upper and lower edge (first and eleventh scanline) of the light converter. The scanlines 110 may, for example, be scanned one after the other (non-interleaving) or in an interleaving sequence, e.g. as described above. The numbering does not necessarily describe the sequence of scanning.

The reference illumination patterns shown in FIG. 2 and FIG. 3 show simple examples of reference illumination patterns. In general, the distance between the scanlines has not to be the same. Furthermore, one or more of the scanlines 110 may be curved or may comprise even corners in order to provide more complicated reference illumination patterns.

Figure 4:
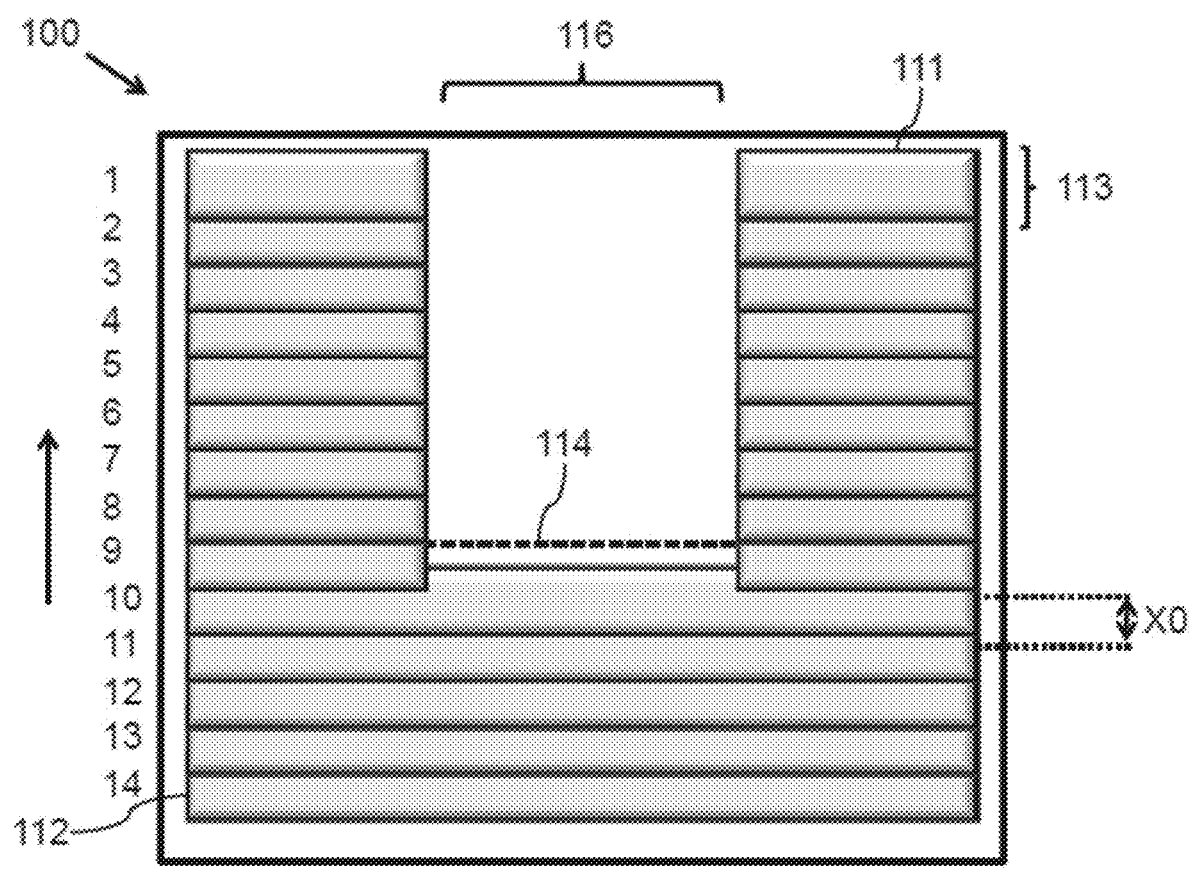
FIG. 4 shows a principal sketch of third illumination pattern

FIG. 4 shows a principal sketch of a third illumination pattern 100. The third illumination pattern 100 is generated by means of a first embodiment of the inventive method. The third illumination pattern 100 comprises 14 scanlines 110 wherein scanlines 1-9 are non-continuous scanlines 111 and scanlines 10-14 are continuous scanlines 112. The illumination pattern 100 comprises an illumination window 116. The illumination window 116 is generated by switching off in subsequent steps a part of the first, second, third etc. scanlines 110 such that the illumination pattern 100 becomes U-shaped. A dashed line shows a cut-off 114 within the illumination window 116 before the respective part of scanline 9 was switched off. The distance between the scanlines 110 is again X0 and the scanline width is 113. The change or shift of the cut-off 114 is reduced by moving or shifting all scanlines 110 around one third of a scanline width 113 to the top as indicated by the arrow on the left side as soon as the part of the ninth scanline 110 is switched off. The shift of the scanlines 110 is preferably performed in a way that original characteristic (straight line in this case) is not changed. The shift may therefore be performed during a step between two scanlines 110. The laser may be switched off in this intermediate phase. This is preferably performed in all embodiments comprising a change of a position of a scanline 110.

Figure 5:
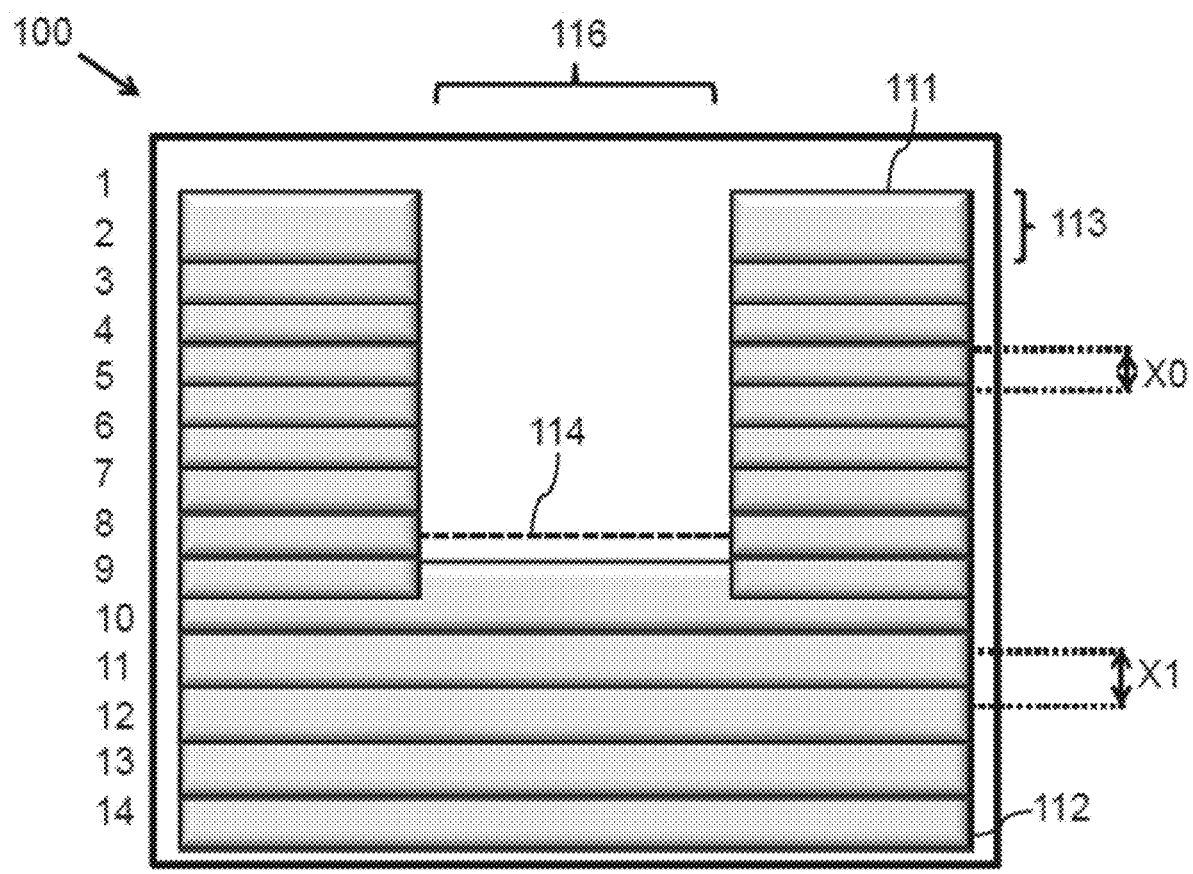
FIG. 5 shows a principal sketch of fourth illumination pattern

FIG. 5 shows a principal sketch of a fourth illumination pattern 100. The fourth illumination pattern 100 is generated by means of the inventive method according to a second embodiment. The illumination pattern 100 is again U-shaped as described with respect to FIG. 4. The distance between continuous scanlines 112 (scanlines 10-14) is increased from X0 to X1 as soon as a part of scanline 9 is switched off in order to reduce the shift of the cut off 114. The distance between the non-continuous scanlines 111 is unchanged (X0).

Figure 6:
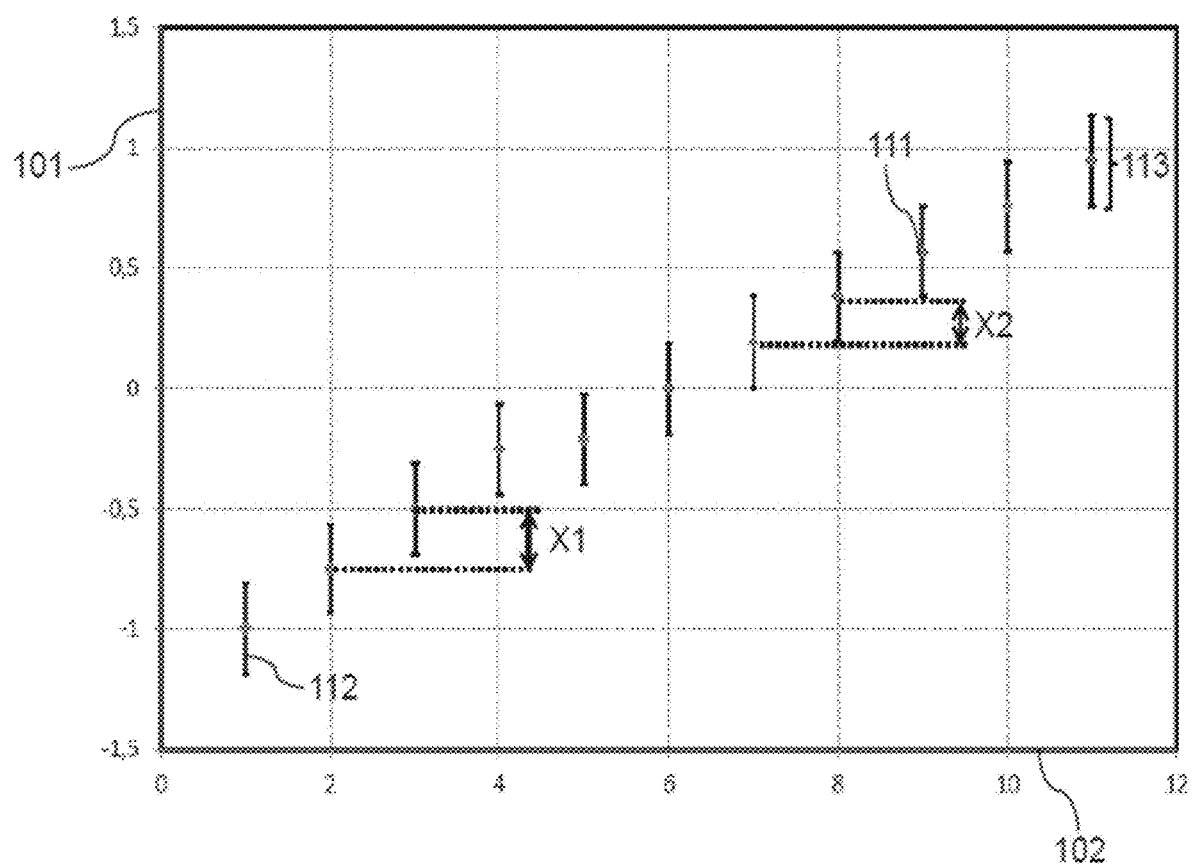
FIG. 6 shows a principal sketch of a fifth illumination pattern

FIG. 6 shows a principal sketch of a fifth illumination pattern 100 generated by means of the inventive method according to a third embodiment. FIG. 6 shows a kind of side view of the illumination pattern 100 as already shown and discussed with respect to FIG. 3. The illumination pattern 100 is again U-shaped. The distance between continuous scanlines 112 (scanlines 1-4) is increased from X0 to X1 as soon as a part of scanline 5 is switched off in order to reduce the shift of the cut-off (not shown). The distance between the non-continuous scanlines 111 (scanlines 5-11) is additionally decreased from X0 to X2.

Figure 7:
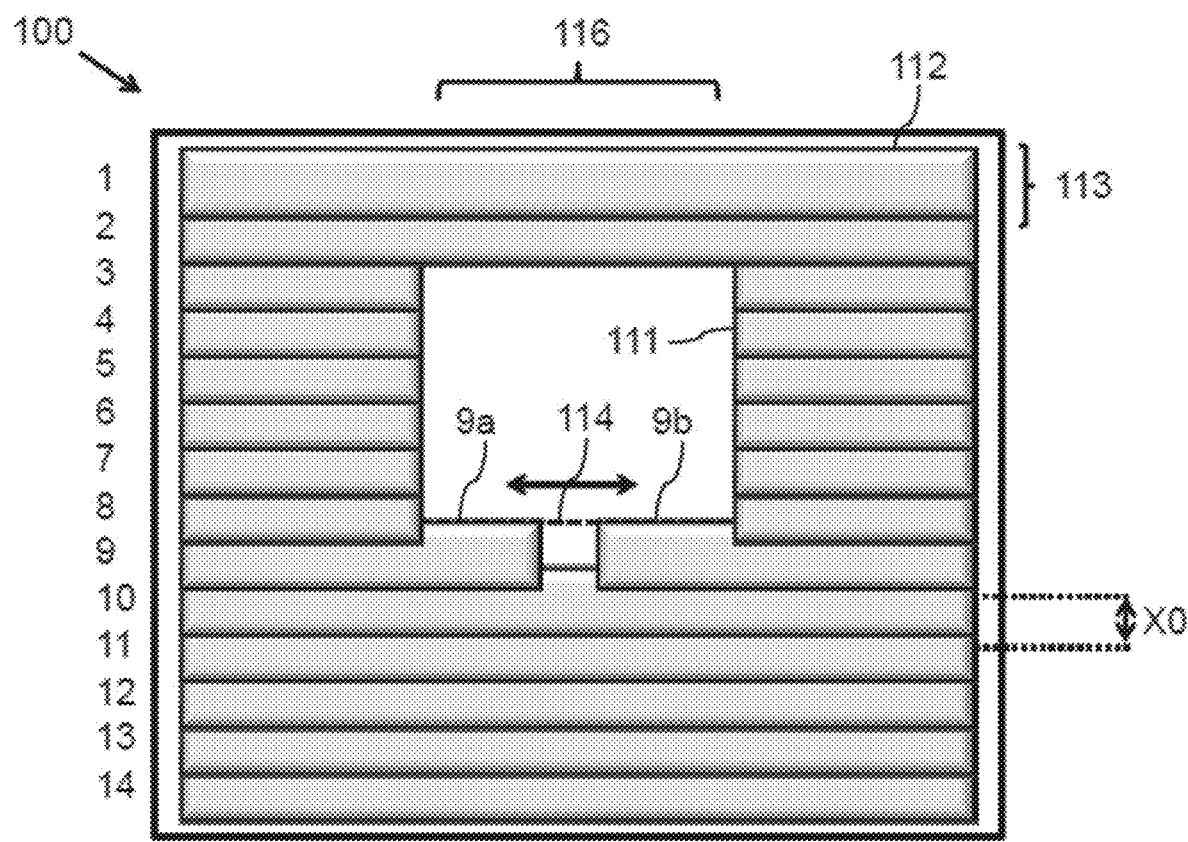
FIG. 7 shows a principal sketch of sixth illumination pattern In the Figures, like numbers refer to like objects throughout. Objects in the Figures are not necessarily drawn to scale.

FIG. 7 shows a principal sketch of a sixth illumination pattern 100 generated by means of the inventive method according to a fourth embodiment. The sixth illumination pattern 100 comprises 14 scanlines 110 wherein scanlines 3-9 are non-continuous scanlines 111 and scanlines 1, 2 and 10-14 are continuous scanlines 112. The illumination pattern 100 comprises an illumination window 116. The illumination window 116 is generated by switching off in subsequent steps a part of the third, fourth, fifth etc. scanline such that the illumination pattern 100 becomes O-shaped. A dashed line shows a cut-off 114 within the illumination window 116 before the respective part of scanline 9 was switched off. The distance between the continuous scanlines 112 is again X0 and the scanline width is 113. The change or shift of the cut-off 114 is at least subjectively reduced by providing a small gap in in the ninth scanline between a first part 9a and a second part 9b. The gap is increased step-by-step along a longitudinal extension of the ninth scanline as indicated by the double arrow. The dark parts in the third, fourth and fifth scanlines may be opened in the same way in a step by step approach one after the other in order to open the window 116. Alternatively, two, three, four or more scanlines may be darkened simultaneously.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 9a first part of a non-continuous scanline
9b second part of a non-continuous scanline
15 laser light
20 converted light
100 illumination pattern
101 position of scanline on the light converter
102 number of scanline
110 scanline
111 non-continuous scanline
112 continuous scanline
113 scanline width
114 cut-off
116 illumination window
200 vehicle headlight system
210 scanning laser arrangement
212 laser
214 scanner
220 light converter
240 controller
250 optical arrangement
X0 distance between scanlines in reference illumination pattern
X1 increased distance between two continuous scanlines
X2 decreased distance between two non-continuous scanlines

The invention claimed is:

1. A method of providing an illumination pattern for vehicle lighting, the method comprising:
scanning a light converter with a scanning laser to provide a reference light pattern comprising scanlines of white light, the scanlines including a first scanline illuminating at least a partial area and a second scanline adjacent to and overlapping the first scanline; and modifying the reference light pattern with a cut-off region to provide an adapted light pattern, the modifying comprising one of:
switching off the scanning laser over the partial area so that the first scanline is a non-continuous scanline which does not illuminate the partial area, and shifting a vertical position of the second scanline that is a continuous scanline to illuminate at least a portion of the partial area; or
dimming the scanning laser over the partial area so that a first portion of the first scanline over the partial area has decreased intensity compared to a second portion of the first scanline outside of the partial area.

2. The method according to claim 1, wherein modifying the reference light pattern comprises switching off the scanning laser over the partial area so that the first scanline is the non-continuous scanline that does not illuminate the partial area, and shifting the position of the second scanline that is the continuous scanline so that it illuminates at least the portion of the partial area.

3. The method according to claim 1, wherein the reference light pattern comprises a third scanline that is a continuous scanline and adjacent to the second scanline, and providing an adapted light pattern comprises increasing a distance between the second scanline and the third scanline.

4. The method according to claim 3, wherein the reference light pattern comprises three or more continuous scanlines including the second scanline and the third scanline, providing an adapted light pattern comprises increasing a distance between adjacent ones of the three or more continuous scanlines, and the method further comprises stepwise decreasing the distance between the three or more continuous scanlines after increasing the distance.

5. The method according to claim 2, wherein modifying the reference light pattern further comprises providing non-continuous scanlines at least one of which is adjacent to the first scanline, and
decreasing a distance between the at least two adjacent non-continuous scanlines.

6. The method according to claim 1, wherein providing the adapted light pattern further comprises increasing or dimming the intensity of the at least two of the scanlines that are adjacent based on a change of distance between the at least two of the scanlines that are adjacent.

7. The method according to claim 1, wherein shifting the position of the second scanline comprises shifting respective positions of each scanline vertically below the second scanline a same distance.

8. The method according to claim 7, wherein each of the scanlines have a scanline width, and the same distance that the second scanline and each scanline vertically below the second scanline is shifted is one third of the scanline width.

9. The method according to claim 1, wherein modifying the reference light pattern comprises dimming the scanning laser over the partial area so that a first portion of the first scanline over the partial area has decreased intensity compared to a second portion of the first scanline outside of the partial area.

10. The method according to claim 9, wherein dimming the scanning laser comprises exponentially adjusting the intensity of the scanning laser over the partial area of the first scanline.

11. A non-transitory computer readable medium comprising instructions saved on at least one memory device coupled with a vehicle headlight system, the instructions when executed by a processor coupled to the vehicle headlight system causing the processor to perform operations comprising the method according to claim 1.

12. A vehicle headlight system comprising:
at least one laser configured to emit laser light with a laser peak emission wavelength, a light converter configured to convert the laser light to converted light having a peak emission wavelength with a greater wavelength than the laser peak emission wavelength, a scanner configured to scan the at least one laser over the light converter to provide a reference light pattern comprising scanlines of white light, the scanlines including a first scanline illuminating at least a partial area and a second scanline adjacent to and overlapping the first scanline, a controller configured to modify the reference light pattern with have a cut-off region to provide an adapted light pattern, the modifying comprising one of:

switching off the scanning laser over the partial area so that the first scanline is a non-continuous scanline which does not illuminate the partial area, and shifting a vertical position of the second scanline that is a continuous scanline to illuminate at least a portion of the partial area; or dimming the scanning laser over the partial area so that a first portion of the first scanline over the partial area has decreased intensity compared to a second portion of the first scanline outside of the partial area.

13. The vehicle headlight system according to claim 12, wherein the controller is configured to modify the reference light pattern by switching off the scanning laser over the partial area so that the first scanline is the non-continuous scanline that does not illuminate the partial area, and shifting the position of the second scanline that is the continuous scanline so that it illuminates at least the portion of the partial area.

14. The vehicle headlight system according to claim 12, wherein the reference light pattern comprises a third scanline that is a continuous scanline and adjacent to the second scanline, and providing an adapted light pattern comprises increasing a distance between the second scanline and the third scanline.

15. The vehicle headlight system according to claim 12, wherein the reference light pattern comprises three or more continuous scanlines including the second scanline and the third scanline, providing an adapted light pattern comprises increasing a distance between adjacent ones of the three or more continuous scanlines, and the method further comprises stepwise decreasing the distance between the three or more continuous scanlines after increasing the distance.

16. The vehicle headlight system according to claim 12, wherein the controller is configured to modify the reference light pattern by further providing non-continuous scanlines at least one of which is adjacent to the first scanline, and decreasing a distance between the at least two adjacent non-continuous scanlines.

17. The vehicle headlight system according to claim 12, wherein the controller is configured to modify the reference light pattern by further increasing or dimming the intensity of the at least two of the scanlines that are adjacent based on a change of distance between the at least two of the scanlines that are adjacent.

18. The vehicle headlight system according to claim 12, wherein the controller is configured to shift the position of the second scanline by shifting respective positions of each scanline vertically below the second scanline a same distance.

19. The vehicle headlight system according to claim 12, wherein the controller is configured to modify the reference light pattern by dimming the scanning laser over the partial area so that a first portion of the first scanline over the partial area has decreased intensity compared to a second portion of the first scanline outside of the partial area.

20. The vehicle headlight system according to claim 19, wherein the controller is configured dim the scanning laser by exponentially adjusting the intensity of the scanning laser over the partial area of the first scanline.

\* \* \* \* \*